Nov. 9, 1954  J. A. ADLOFF  2,693,714
GEAR SHIFT MECHANISM FOR TRANSMISSIONS
Filed Sept. 23, 1949  2 Sheets-Sheet 1

Inventor
Jakob August Adloff
By
Spencer, Willits, Helmig & Baillio
Attorneys

Nov. 9, 1954  J. A. ADLOFF  2,693,714
GEAR SHIFT MECHANISM FOR TRANSMISSIONS
Filed Sept. 23, 1949  2 Sheets-Sheet 2

Inventor
Jakob August Adloff
By
Spencer, Willits, Helwig & Gaillio
Attorneys

United States Patent Office 2,693,714
Patented Nov. 9, 1954

2,693,714

GEAR SHIFT MECHANISM FOR TRANSMISSIONS

Jakob August Adloff, Mainz-Gonsenheim, Germany, assignor to General Motors Corporation, Detroit, Mich., a corporation of Delaware Application September 23, 1949, Serial No. 117,366

Claims priority, application Germany October 1, 1948

15 Claims. (Cl. 74—484)

This invention concerns a gear shift mechanism for transmissions in which gear shifting is accomplished by axial displacement and rotation of a shift rod placed parallel to the steering column. The shift rod is actuated by a shift lever which is located preferably just under the steering wheel. Shift movement is transmitted to change gears in the transmission by links which lead from the shift rod to the transmission housing and which shift the gears or synchronizing clutches. The advantages of this mechanism consists in the accessibility of the shift lever and in the increase of leg room through elimination of a conventional lever. Gear shift mechanism of this type are known; the object of the invention is to improve and to lower costs of manufacture of known systems by structural simplification, especially by reduction of moving parts.

This invention lies in the fact that the shift rod actuated by the shift lever is connected to the shift mechanism in the transmission by a single link in such a way that the axial displacement of the shift rod selects the change speed group, simultaneously locking out the other group, and the rotation of the shift rod shifts the change speed gears or synchronizing clutches. Other advantages will appear in the following description of one embodiment of the invention by way of example and in the appended claims.

In the drawings Fig. 1 represents a perspective view of the vehicle engine, clutch and transmission with the gear shift mechanism applied according to the invention.

Figure 1:
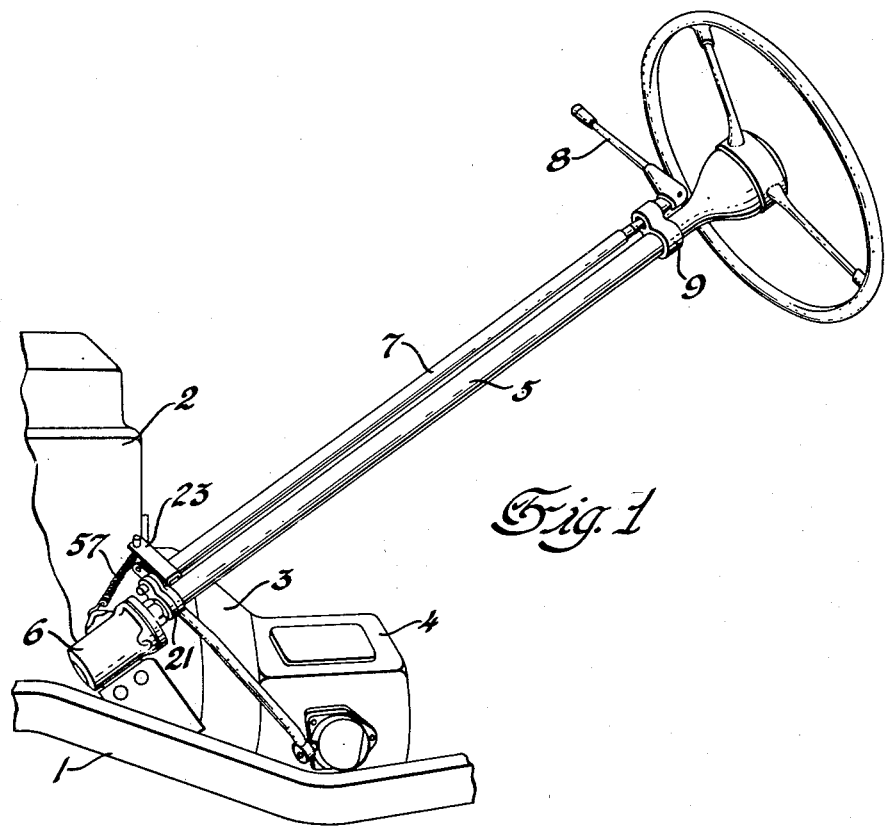
Figure 2:
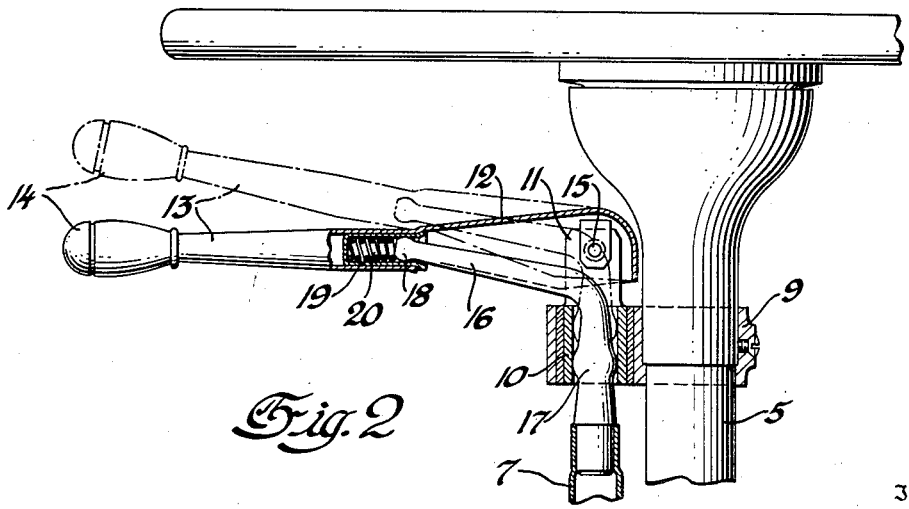
Fig. 2 is a section through the upper end of shift rod and shift lever.
Figure 3:
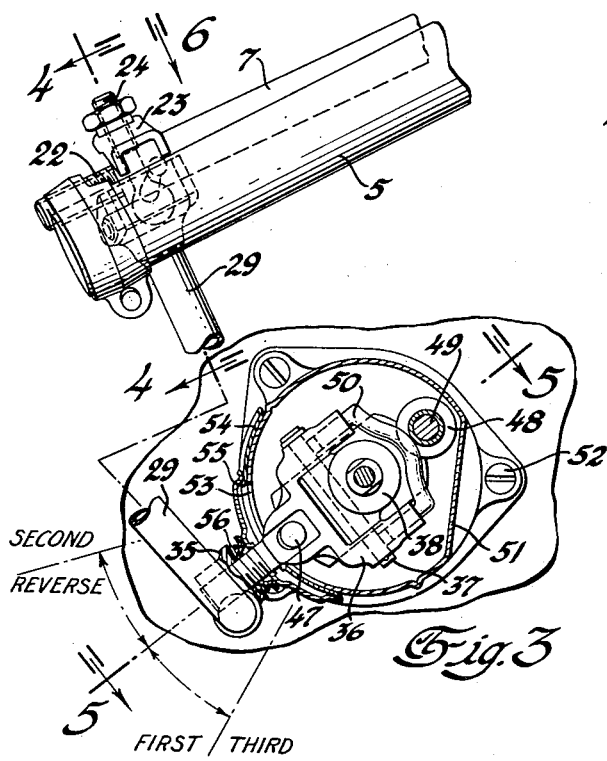
Fig. 3 shows a view of the lower end of the shift rod and of the transmission housing where the gear shift mechanism is shown in section and the front shift plate is removed.
Figure 4:
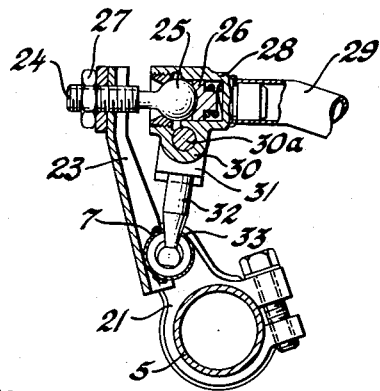
Fig. 4 is a section along the line 4—4.
Figure 5:
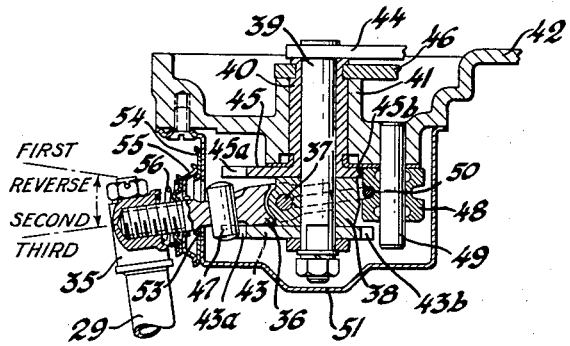
Fig. 5 is a section along line 5—5.
Figure 6:
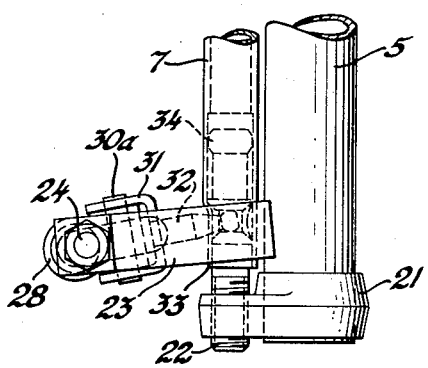
Fig. 6 is a view along direction of arrow 6 in Fig. 3.

In the drawings numeral 1 represents the frame of the vehicle, 2 is the engine, 3 the clutch housing and 4 the transmission housing. Parallel to the steering column 5 which rests at its lower end on steering gear box 6 fixed to the chassis is an axially displaceable and rotatable hollow shift rod 7 actuated by the shift lever 8. As will be more fully explained later on, the up and down movement of the shift lever 8 corresponding to axial displacement of shift rod 7 selects the change speed group, while the actual shifting is accomplished by a side to side movement of hand lever 8 corresponding to the rotation of shift rod 7.

Bracket 9, fastened to the upper end of steering column 5, provides bearing 10 for the shift rod 7 and fork 11 for shift lever pivot. Shift lever 8 consists of curved cover 12, tubular handle portion 13 and knob 14. It is pivoted at 15. Arm 16 is welded to the upper end of shift rod 7 and is provided with a spherical enlargement which slides in bearing 10 of bracket 9. The ball end 18 of arm 16 projects in the tubular handle portion 13 of shift lever 8, where it abuts against spring 20 housed in sheath 19.

Another bracket 21 is fastened to the lower end of steering column 5 and carries a guide pin 22 for shift rod 7. The lower end of shift rod 7 is welded to a U-shaped strut or arm 23 which has a threaded bolt 24 and its ball end 25 secured to it by nut 27. The socket 26 for ball end 25 is within a joint member 28 fastened to link 29, which transmits shift movements to gear shift mechanism in the transmission. Member 28 has on its side a bearing opening 30, for pin 30a. Fork 31 is a prolongation of bolt 32 and rotates about pin 30a. Bolt 32 has a bearing in guide pin 22 and projects through a slit 33 in the lower end of shift rod 7. When shift rod 7 is displaced by an up and down movement of lever 8 about axis 15, it slides on ball end 34 of guide pin 22. The motion is transmitted to link 29 by strut 23 and bolt 24. Since the fork 31 and bolt 32 are connected to the fixed guide pin 22, the upper end of link 29 describes an approximate horizontal circular motion about the ball end of bolt 32 as center. The lower end of link 29 will move horizontally, transverse to the axis of the transmission, which movement selects the change speed group. To obtain the desired gear ratio the lever 8 must be moved side to side, whereby the shift rod 7 will be rotated. Strut 23 and bolt 24 transmit this movement also to link 29 whose upper end will describe a vertical circular motion about the ball end of bolt 32 as center. The lower end of link 29 will move vertically, which will shift the gears or synchronizing clutches. Member 35 connects the lower end of link 29 with the shift fork or actuator arm 36 which is rotatable about pin 37. Pin 37 connects the shift fork with articulating or pivot member 38, which is rotatable about shaft 39. Shaft 39 is inside hollow shaft 40 which is in turn rests in a bearing 41 of transmission housing 42. Shift plate or crank 43 is fixed to the outer end of shaft 39, while the lower end carries a shift segment 44 or else an actuating member for the shift segment. In the same way shift plate 45 and shift segment 46 are fixed on hollow shaft 40. Shift plates 43 and 45 have notches 43a and 45a respectively, which a dog 47 carried by shift fork 36 engages, corresponding to lower or upper position of shift lever 8. As already mentioned, the up and down movement of lever 8 causes an approximate horizontal movement of lower end of link 29. This movement will make shift fork 36 rotate about pin 37 and the dog 47 will engage shift plate 43 or 45 (group 1=low and reverse, group 2=second and third). To obtain the desired gear ratio the shift lever 8 must be moved from side to side which will cause the lower end of the link to move vertically. Shift fork 36 as well as the engaged shift plates 43 or 45 and the shift segments 44 or 46 will rotate in one or the other direction about shaft 39.

Movable roller 48 serves to lock out the change speed group which is not selected. It engages notches 43b or 45b in the shift plates. It moves on shaft 49 and is actuated by member 50, which is fixed to shift fork 36. Cover plate 51, attached to transmission housing by screw 52, protects the mechanism from dirt. Opening 53 in cover plate 51, which allows the vertical and horizontal motion of shift fork 36, is covered by plates 54 and 55 which are biased toward each other by spring 56 and are movable with respect to each other and with respect to cover plate 51. Spring 57 is provided between shift rod 7 and a fixed point, e. g., the steering gear box 6 (Fig. 1), which moves the shift rod to its lower position when gears are out of engagement. Hence the shift lever 8, when in neutral position, is biased toward the position of change speed group 2 (second and third). The above embodiment of the invention may be changed in structural details without departing from the scope of the invention.

I claim:

1. In a transmission control mechanism, a rod mounted for rotary and reciprocating control movement, a strut fixed to said rod, a support member for said rod having a socket in axial alignment with said rod, a link universally pivotally connected to said strut, and a member pivotally connected to said support socket and connected to said link to rotate said link when the rod is reciprocated and to reciprocate said link when said tube is rotated.

2. In a transmission control mechanism, a frame, a control shaft and a control sleeve concentrically mounted in said frame, a member secured to said shaft, a member secured to said sleeve, a pivot member rotatably mounted on said shaft between said members, an actuator arm pivotally connected to said pivot member, cooperating means on said actuating arm and said members to selectively engage the shaft member or the sleeve member to selectively operate the shaft or sleeve and cooprating lock means on said actuating arm and said members to selectively engage the shaft member or the sleeve member to selectively lock the shaft or sleeve that is not being operated.

3. In a gearshift mechanism, a control rod mounted for reciprocating and rotary movement, means to support one end of said rod and to provide a pivot, an arm secured to said rod, a transfer link pivotally connected to said arm to reciprocate said transfer link when the control rod is rotated, a member pivoted to said support pivot and to said transfer link to rotate said transfer link when the control rod is reciprocated, a shift fork connected to the other end of said link, a shaft and a sleeve coaxially journalled in a frame, a shift plate secured to said shaft, a shift plate secured to said sleeve, a pivot member mounted on said shaft between said plates, said fork being pivotally connected to said member, and means interconnecting said fork and said plates to selectively rotate said plates.

4. In a control device for a change speed gear mechanism, a support, a control rod mounted for longitudinal displacement and rotation on said support, a control lever, means connecting said control lever to said control rod to longitudinally displace and to rotate said control rod, an actuator strut secured to said control rod and extending laterally from said control rod, a transmission connecting link for transmitting the longitudinal displacement and the rotational movement of the control rod to the transmission, a first pivotal connection between said link and the outer end of said strut to transmit the rotary movement of the control rod into longitudinal movement of said link, a member pivotally mounted on said support on the axis of said control rod, and said member having a forked end and being pivotally connected to said link adjacent said first pivotal connection for swinging movement longitudinally of said link to transmit the longitudinal displacement of said control rod into rotary movement of said link.

5. In a control device for a change speed gear mechanism, a support, a control rod mounted for longitudinal displacement and rotation on said support, a control lever, means connecting said control lever to said control rod to longitudinally displace and to rotate said control rod, an actuator strut secured to said control rod and extending laterally from said control rod, a transmission connecting link for transmitting the longitudinal displacement and the rotational movement of the control rod to the transmission, a first pivotal connection between said link and the outer end of said strut to transmit the rotary movement of the control rod into longitudinal movement of said link, a member pivotally mounted on said support adjacent said control rod, and said member having another portion pivotally connected to said link adjacent said first pivotal connection for swinging movement longitudinally of said link to transmit the longitudinal displacement of said control rod into rotary movement of said link.

6. In a control device for a change speed gear mechanism, a support, a control rod mounted for longitudinal displacement and rotation on said support, a control lever, means connecting said control lever to said control rod to longitudinally displace and to rotate said control rod, an actuator strut secured to said control rod and extending laterally from said control rod, a transmission connecting link for transmitting the longitudinal displacement and the rotational movement of the control rod to the transmission, a ball and socket joint between said link and the outer end of said strut consisting of a ball fixed to the strut and a socket at the end of said link, a member pivotally mounted on said support on the axis of said control rod, and said member having a forked end and being pivotally connected to said link adjacent said ball joint for swinging movement longitudinally of said link.

7. In a control device for a change speed gear mechanism, a transmission connecting link, control means connected to said link to longitudinally displace and to rotate said link, a pair of gear actuating shafts for connection to the change speed gears, a crank mounted on each shaft, an articulating member rotatably mounted between said cranks, an actuator arm joined by a pivot to said articulating member, said actuator arm pivot being positioned for movement of said actuator arm from one crank to the other crank, said connecting link being joined by a pivot to said actuator arm, and said link pivot being positioned for movement of said link relative to said actuator arm only when the actuator arm and joint member rotate as a unit.

8. In a control device for a change speed gear mechanism, a transmission connecting link, control means connected to said link to longitudinally displace and to rotate said link, a pair of gear actuating elements for connection to the change speed gears, a crank connected to each of said elements, an articulating member rotatably mounted between said cranks, a shift member pivoted to said articulating member for reciprocating movement from one crank to the other crank and for rotary movement with said cranks, and said connecting link being joined by a pivot to said actuator arm for pivotal movement when said actuator arm is rotated and for a fixed connection when said actuator arm is reciprocated from one crank to the other crank.

9. In a control device for a change speed gear mechanism, a support, a control rod mounted on a support for longitudinal and rotary movement, control means to longitudinally displace and to rotate said control rod, a transmission connecting link, means connecting said rod to said link to rotate and reciprocate said link, a pair of coaxial gear actuating shafts, a crank on each shaft, an articulating member rotatably mounted coaxially of said shafts between said cranks, an actuator arm joined by a pivot to said articulating member, said actuator arm pivot being transverse to said shafts, said connecting link being joined by a pivot to said actuator arm, and said link pivot being substantially parallel to said actuator arm pivot.

10. In a transmission control mechanism, a frame, a control shaft and a control sleeve concentrically mounted in said frame, a member secured to said shaft, a member secured to said sleeve, an actuator arm pivotally connected to said shaft between said members, cooperating means on said actuating arm and said members to selectively engage the shaft member or the sleeve member to selectively operate the shaft or sleeve, and cooperating lock means on said actuating arm and said members to selectively engage the shaft member or the sleeve member to selectively lock the shaft or sleeve that is not being operated.

11. In a control device for a change speed gear mechanism, a support, a control rod mounted for longitudinal displacement and rotation on said support, a control lever, means connecting said control lever to said control rod to longitudinally displace and to rotate said control rod, an actuator strut secured to said control rod and extending laterally from said control rod, a transmission connecting link for transmitting the longitudinal displacement and the rotational movement of the control rod to the transmission, a ball and socket joint between said link and the outer end of said strut consisting of a ball fixed to the strut and a socket in the center of said link, a member pivotally mounted on said support on the axis of said control rod, and said member being planar pivotally connected to said link adjacent said ball joint for swinging movement longitudinally of said link.

12. In a transmission control mechanism, a rod mounted for rotary and reciprocating control movement, a strut fixed to said rod, a support member for said rod having a socket in proximate relation to said rod, a link universally pivotally connected directly to said strut, and a member pivotally connected to said support socket and directly connected to said link to rotate said link when the tube is reciprocated and to reciprocate said link when said tube is rotated.

13. In a transmission control mechanism, a support, a control rod mounted for rotary and reciprocating control movement on said support, means to rotate and reciprocate said control rod, a rigid link extending transversely of said control rod, a strut fixed to said control rod and universally connected directly to said rigid link to reciprocate said rigid link when said control rod is rotated and means directly connecting said support and rigid link to rotate said rigid link when said control rod is reciprocated.

14. In a transmission control mechanism, a control rod, means to support the rod for rotary and reciprocating control movement, a completely rigid link, and means directly connecting the rod and link to rotate the link when the rod is reciprocated and means directly connecting the rod and link to reciprocate the link when the rod is rotated, a transmission having a shift member mounted for pivotal movement in transverse planes, and said link being rigidly connected to the shift member.

15. In a transmission control mechanism, a control rod, means to support the rod for rotary and reciprocating control movement, a completely rigid controlling link, means to connect the control rod to said link to convert said rotary movement into reciprocating movement and to convert said reciprocating movement into rotary movement, a pair of controlled members, and means, including an actuating arm rigidly connected to said link and mounted for pivotal movement in two transverse planes, connected to the controlled members to select one of the controlled members in response to rotary movement of the link and to actuate the selected controlled member in response to reciprocating movement of the link.

References Cited in the file of this patent

UNITED STATES PATENTS

| Number | Name | Date |
|---|---|---|
| 2,171,953 | Seaholm | Sept. 5, 1939 |
| 2,277,745 | Dence | Mar. 31, 1942 |
| 2,303,562 | Kurtz | Dec. 1, 1942 |
| 2,303,787 | Burd | Dec. 1, 1942 |
| 2,324,732 | Slack | July 20, 1943 |
| 2,481,465 | Auten | Sept. 6, 1949 |